United States Patent [19]

Leonard

[11] 4,246,456
[45] Jan. 20, 1981

[54] MONITORING DEVICES

[75] Inventor: Haydn A. Leonard, Norwich, England

[73] Assignee: The Marconi Company Limited, Chelmsford, England

[21] Appl. No.: 36,370

[22] Filed: May 7, 1979

Related U.S. Application Data

[63] Continuation of Ser. No. 788,034, Apr. 15, 1977, abandoned.

[30] Foreign Application Priority Data

Aug. 1, 1975 [GB] United Kingdom ............... 32319/75

[51] Int. Cl.$^3$ .......................................... H01H 35/00
[52] U.S. Cl. ................................ 200/61.08; 200/61.4
[58] Field of Search ................. 200/61.08, 61.4, 61.93

[56] References Cited

U.S. PATENT DOCUMENTS

| | | | |
|---|---|---|---|
| 3,230,327 | 1/1966 | McDowell | 200/61.08 |
| 3,477,019 | 11/1969 | Hartmann | 200/61.08 X |
| 3,751,613 | 8/1973 | Inose et al. | 200/61.08 X |
| 3,822,369 | 7/1974 | Kunczynski | 200/61.08 |
| 3,825,891 | 1/1974 | Kinast | 200/61.4 X |
| 3,853,199 | 12/1974 | Hirashima et al. | 200/61.08 X |
| 3,869,695 | 3/1975 | Kita | 200/61.4 X |
| 4,006,326 | 2/1977 | Lejeune | 200/61.08 X |

FOREIGN PATENT DOCUMENTS

| | | | |
|---|---|---|---|
| 1143098 | 2/1969 | United Kingdom | 200/61.08 |
| 1171951 | 11/1969 | United Kingdom | 200/61.08 |

Primary Examiner—James R. Scott
Attorney, Agent, or Firm—Diller, Ramik & Wight

[57] ABSTRACT

A monitoring device is provided for monitoring the gap between two relatively moving parts. In its preferred form the device consists of a bar of fracturable material mounted on one part and extending towards the other. A striker mounted on the other part is provided to hit and fracture the bar when the gap separation reduces by a predetermined amount. The bar is weakened at a position where fracture is desired and a conductive track is provided across the line of fracture which track is rendered open circuit as fracture occurs.

7 Claims, 6 Drawing Figures

MONITORING DEVICES

This is a continuation, of application Ser. No. 788,034 filed Apr. 15, 1977 now abandoned.

BACKGROUND OF THE INVENTION

This invention relates to monitoring devices and in particular to devices for monitoring the separation between two relatively movable parts.

With many kinds of machinery it is often desirable that some indication be provided that the separation between two relatively moving parts has reduced by more than a given extent. In the case of a turret crane for example, the crane jib structure is mounted on a platform which is rotatably carried from a base by means of a ring bearing. Monitoring the extent to which the separation decreases during rotation between the base and platform provides an indication of the state of wear in the ring bearing.

BRIEF SUMMARY OF THE INVENTION

The present invention seeks to provide an improved and simple monitoring device which will provide an indication that a separation between two relatively moving parts has reduced beyond a given limit.

According to this invention in its broadest aspect a device for monitoring the separation between two relative moving parts comprises a fracturable member provided to be mounted fixedly with respect to one of said two parts to extend towards the other and such that if the separation between said two parts reduces to a predetermined extent part of said other member contacts said fracturable member to fracture the same to provide an indication that said separation has reduced to or beyond said extent.

In its simplest form the fracturing itself may be arranged to provide a visual indication. For many applications however it is desirable not only to provide a warning that a separation between two relatively moving parts has reduced beyond a given limit, but also to initiate some control action, such as, for example, the arresting of relative motion between said two parts.

In the case of a colliery winder, for example an "overwind" protection arrangement is usually provided in which limit switches are included in the circuit of the main circuit breaker of the winder. These limit switches are generally pushrod lever and spring operated with a capacity of many thousands of operations although each may not be called upon to operate once in many years. Switches such as these may often be located in an environment which is extremely hostile to such mechanisms and corrosion of pushrods, lever pivots and the contacts themselves can occur after long periods of inactivity. The result is that such switches are liable to fail to operate at the time when they are most required.

According to a feature of this invention said fracturable member is provided with a path of conductive material extending across a point at which fracture is expected to occur whereby when such fracture occurs electrical continuity through said path is interrupted.

In this form the monitoring device is provided as an electrical switch which is normally conductive. This switch may be utilized so that when, as a result of fracture, electrical continuity is interrupted, a warning device may be triggered and/or a control action initiated, such as, for example, the arresting of relative motion between said two relatively moving parts.

In this form, the device lends itself advantageously for use in such purposes as the overload protection of a colliery winder as mentioned above, since the device may readily be made so as to be substantially unaffected by most hostile environments.

Preferably said fracturable member is in the form of a length of bar. Said conductive path may be in the form of a strip conductor extending from one side of said bar to the other over an end of said bar which is expected to be broken off, but preferably said conductive path is in the form of a loop provided on one broad face of said bar and extending across a position at which fracture is expected to occur.

More than one loop may be provided on the same broad face if desired or a further loop or further loops provided on the opposite broad face, and where the conductive path is a strip conductor extending from one side of the bar to the other, more than one strip conductor may be provided extending over the same end.

Preferably said bar is rectangularly sectioned.

Preferably again said fracturable member is weakened at a position where fracture is desired. The material of said fracturable member is not critical provided it is sufficiently brittle for fracture to occur without itself being the cause of damage. Suitable materials include porcelain, ceramic or glass. The conductive path may be formed of electro-conductive metals, alloy, carbon or a suitable oxide provided on said fracturable member by sputtering, evaporation, etching or other suitable method. The conductive path should be such that it does not significantly impair fracturability of the fracturable device.

When mounted in operation the conductive path may be connected in a control circuit which is enabled, when fracture occurred and the layer rendered open circuit, to operate an alarm or initiate a control action such as the arresting or relative motion between the two relative moving parts.

Preferably said other relatively moving part is provided with a striker, of hard steel or other suitable strong material, extending towards said one part, which striker acts to fracture said fracturable device if the separation between the two relative moving parts decreases to said predetermined extent.

BRIEF DESCRIPTION OF THE DRAWING FIGURES

The invention is illustrated in and further described with reference to the accompanying drawings in which, FIG. 1 is a sectional side elevation of one monitoring device in accordance with the present invention, FIG. 2 is an end elevation of the device of FIG. 1, FIG. 3 illustrates the device of FIGS. 1 and 2 mounted in operation between two relatively moving parts, FIG. 4 is a plan view of another monitoring device in accordance with the present invention, FIG. 5 is a section in elevation along the line 5—5 of FIG. 4 and FIG. 6 is a section in elevation along the line 6—6 of FIG. 4.

DETAILED DESCRIPTION OF THE INVENTION

Figure 1:
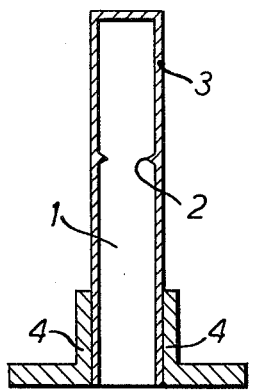
Figure 2:
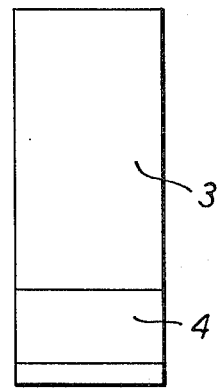

Referring to FIGS. 1 and 2, the fracturable device consists of a rectangular bar or core 1 of brittle material, in this case porcelain. The core 1 is weakened by a relieving groove 2 so as to assist in the obtaining of a clean fracture about the groove if the uppermost (as shown) part of the core 1 is struck. The two larger area surfaces and the top of the core 1 is provided with a thin film layer of an electro-conductive metal 3 deposited by sputtering. The layer 3 is sufficiently thin for the fracturability of the fracturable member not to be seriously impaired. The core 1 with its layer 3 is provided with terminals 4, one attached to each broad face of the device, at the base thereof. The terminals 4 function not only so as to enable the conductive layer 3 to be connected in a control circuit responsive to the disruption of the conductive path formed by the layer, but also to provide a means for securing the device in operation.

Figure 3:
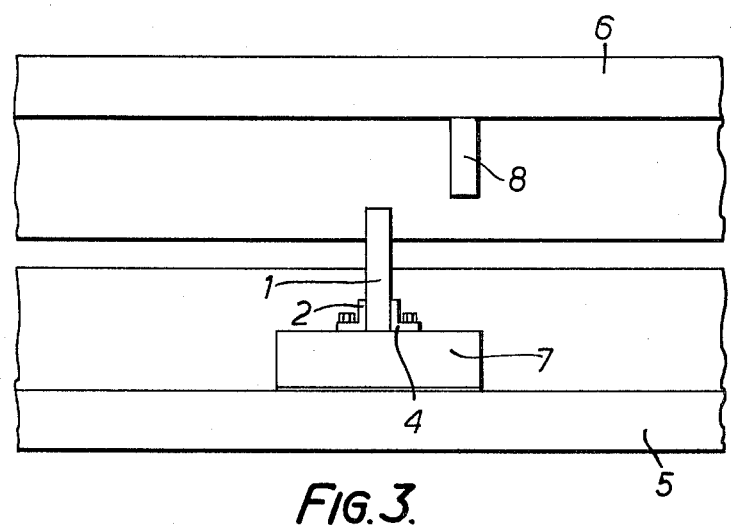

Referring to FIG. 3, it is required to monitor the separation between two members 5 and 6 which are relatively rotatable about a common axis by means of a ring bearing (not shown). The device shown in FIG. 1, is secured by means of the terminals 4 onto an insulating mounting base 7 such that the fracturable device extends towards member 6. Member 6 itself is provided with a hard steel striker 8 extending towards member 5 on the same mean radial path as the fracturable device.

Whilst the separation between members 5 and 6 is satisfactory, the striker 8 will not contact the fracturable device. If, however, this separation decreases, due for example to wear in the bearing means between members 5 and 6 striker 8 will eventually contact the fracturable device and disrupt the electrical conductive path provided by the layer 3. This in turn causes the control circuit to operate an alarm and/or initiate a control action to cause the relative rotation of members 5 and 6 to cease. If desired, further fracturable devices and strikers may be provided between the same members 5 and 6.

Figure 4:
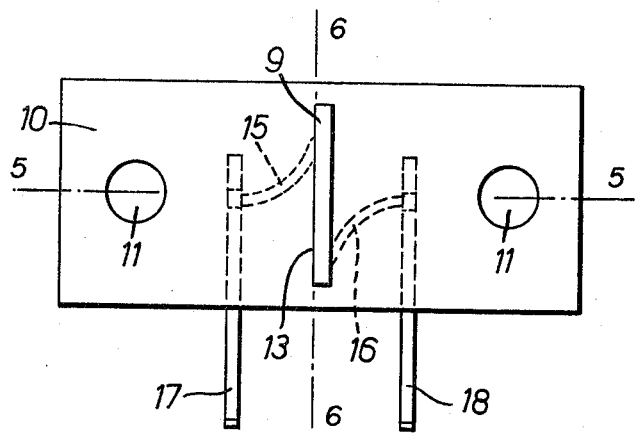
Figure 6:
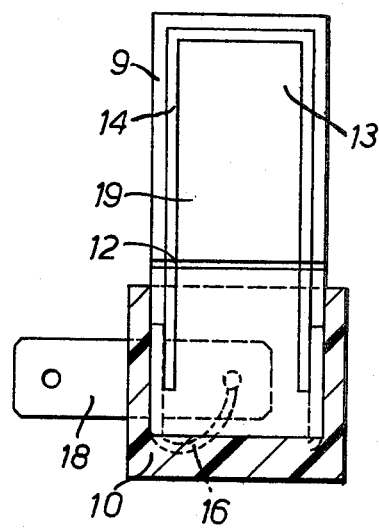
Figure 5:
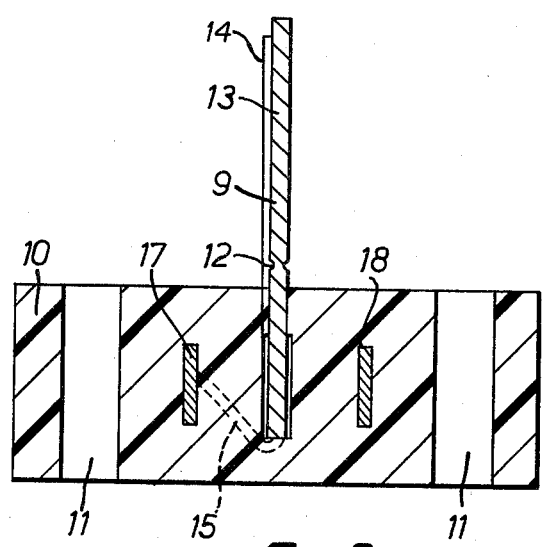

Referring to FIGS. 4 to 6, the fracturable member again consists of a rectangular bar or core 9 of porcelain which is embedded in an anchoring base 10 of insulating material, in this case synthetic resin. Holes for fixing the base 10 to a relatively moving part such as 5 of FIG. 3 are shown at 11. The core 9 is weakened by a relieving groove 12 to assist in the obtaining of a clean fracture if the upper portion of the core 9 is struck. One large area surface 13 of the core 9 is provided with a thin film loop 14 (not represented in FIGS. 4 and 5) of electro-conductive metal extending across the relieving groove 12 so that a fracture at this position will interrupt the conductivity of the loop 14. This film loop 14 is deposited by sputtering and is sufficiently thin for it not seriously to impair the fracturability of the core 9. Either end of the loop 14 is connected by a lead 15 or 16 to a terminal 17 or 18. Terminals 17 and 18 are themselves embedded in anchoring base 10.

The portion of core 9 extending beyond the anchoring base 10, and the conductive loop 14, are covered by a protective coating 19 (again not represented in FIG. 4 or 5) of plastics material. Whilst in both the embodiment shown in FIGS. 1 to 3 and the embodiment shown in FIGS. 4 to 6 only one conductive path is provided, where a multiplicity of circuits are to be interrupted at the same time a plurality of paths may be provided on the core so as to be interrupted when fracture occurs. In the case of the embodiment of FIGS. 1 to 3, a number of discrete layers may be provided in parallel over the top of the core 1. In the case of the embodiment of FIGS. 3 to 6 a number of conductive loops may be provided on the same large area surface or a further loop or further loops may be provided on the large area surface opposite large area surface 13.

I claim:

1. A safety device for providing electrical indication of machine malfunction, which comprises an elongate bar of fracturable material, means for anchoring one end of said bar upon a first machine portion to project said bar in cantilever fashion therefrom and position the free end of said bar to be struck with fracturing force by a second machine portion in response to machine malfunction, said first and second machine portions being relatively movable along a path generally normal to the longitudinal axis of said elongated bar, said bar presenting an outer surface between the ends thereof, electrical path means on said surface for providing electrical indication when said bar is fractured, said path means comprising a loop of electrically conductive material presenting spaced leg portions extending lengthwise of said bar and a bight portion joining said leg portions adjacent said free end of the bar and remote from terminal ends of said leg portions, said loop of conductive material being in the form of a thin film layer formed on and joined to said surface so as to be exposed for visual inspection while assuring rupture thereof in response to fracture of said bar, means transversely spanning said bar for weakening the same such that fracture of said bar will occur at and transversely across said weakening means, and said weakening means being further located between said bight portion and said terminal ends thereby assuring that fracture of said bar results in the rupture of said conductive material.

2. A device as defined in claim 1 wherein said weakening means is a line of reduced thickness on said elongated bar.

3. A device as defined in claim 1 wherein said second machine portion is a striker bar of relatively strong material.

4. A device as defined in claim 1 wherein said bar is made of electrically non-conductive material and said thin film layer is deposited directly thereon.

5. A device as defined in claim 4 wherein said bar is of elongate rectangular cross section and said loop is formed on one broad exterior face of the bar.

6. A device as defined in claim 5 wherein at least one further loop is provided on an opposite broad face of said bar.

7. A device as defined in claim 5 wherein more than one loop is provided on the same broad face of said bar.

* * * * *